Jan. 2, 1945.  A. H. WALLACE  2,366,301
WEED KILLER
Filed Feb. 21, 1942  2 Sheets-Sheet 1
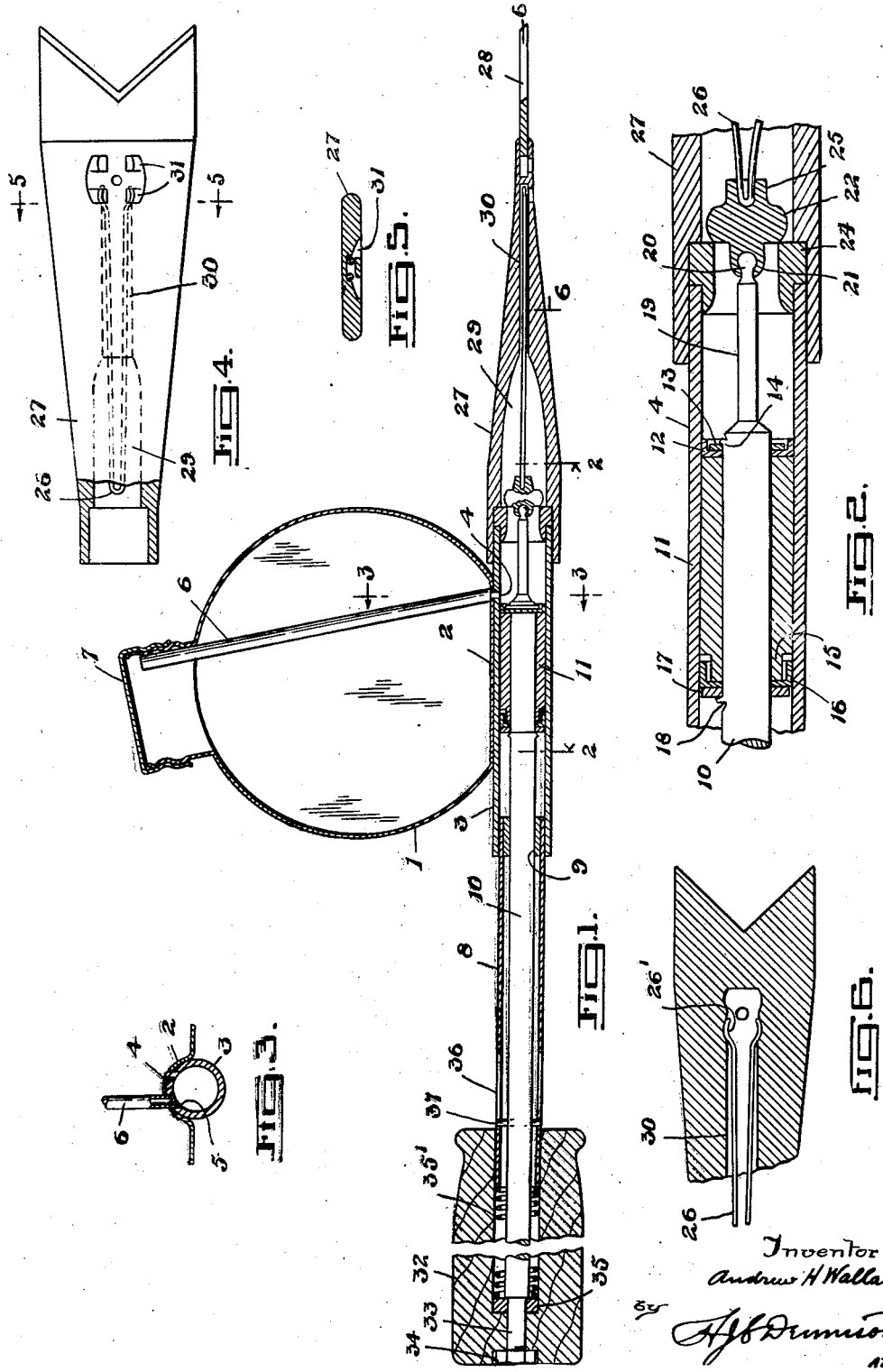
Inventor
Andrew H Wallace
ATTY.

Jan. 2. 1945. A. H. WALLACE 2,366,301
WEED KILLER
Filed Feb. 21, 1942 2 Sheets-Sheet 2
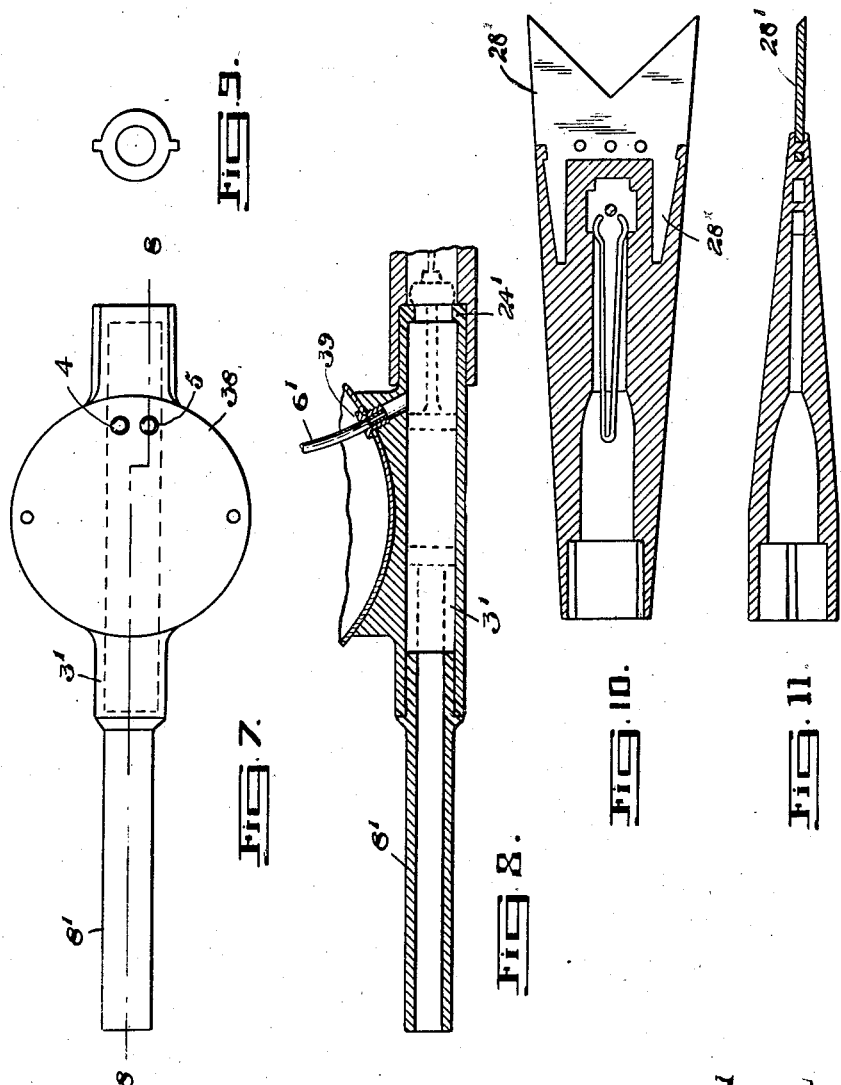
Inventor
Andrew H Wallace
By
ATTY.

Patented Jan. 2, 1945

2,366,301

UNITED STATES PATENT OFFICE 2,366,301

WEED KILLER

Andrew H. Wallace, Lockport, N. Y.

Application February 21, 1942, Serial No. 431,787

3 Claims. (Cl. 47—49)

This invention relates to improvements in devices for cutting and killing weeds and the principal objects of the invention are to provide a simple inexpensive form of hand-operated instrument with which the top of the weed may be severed from the root and which will automatically discharge a small measured quantity of a fluid directly in contact with the cut surfaces of the root which will effectively kill it.

A further object of the invention is to devise an instrument free from small or intricate working parts which will be liable to be broken or become inoperative.

The principal feature of the invention consists in the novel arrangement of an operating plunger within a tubular member carrying a cutter at one end in which a duct is arranged to discharge through orifices in the underside thereof, the tubular member having orifices opening into a liquid supply reservoir carried thereby and which are directly opened and closed by said plunger in the operation of the instrument.

A further feature of importance consists in the novel construction of a portion of the tubular member of a unitary moulded form to carry the liquid supply reservoir and to form a cylinder for the fluid control portion of the plunger.

In the accompanying drawings Figure 1 is a longitudinal mid-section of my improved instrument, being broken intermediate of the length of the operating handle.

Figure 2 is an enlarged horizontal sectional view of a portion of the plunger and its cylinder taken between the transverse lines 2—2 of Figure 1.

Figure 3 is a cross section through the instrument taken on the line 3—3 of Figure 1.

Figure 4 is an underside plan of the cutter end of the instrument.

Figure 5 is a cross section taken on the line 5—5 of Figure 4.

Figure 6 is a horizontal section of the cutter end taken on the line 6—6 of Figure 1.

Figure 7 is a plan view of a modified form of the cylinder portion of the instrument.

Figure 8 is a vertical longitudinal section taken on the line 8—8 of Figure 7.

Figure 9 is an elevational view of one end of the cylinder shown in Figure 7.

Figure 10 is a horizontal mid-section through the cutter to be used with the structure illustrated in Figure 7.

Figure 11 is a vertical mid-section through the cutter illustrated in Figure 10.

It is well known by those having the care of lawns and greens that noxious weeds and particularly those which spread over flat surfaces, such as dandelions and plantains, are very difficult to remove and this invention has been devised particularly for killing this type of weed and to do so in a manner that the liquid used to kill the weed root will not spread to wide areas and destroy the surrounding grass.

In order to accomplish the desired result it is necessary that the "killing" liquid be discharged directly against the cut surface of the root and that the quantity discharged be definitely limited.

In my United States Patent No. 2,293,090 of August 18, 1942, I have shown a structure in which the cutter is provided with openings in the underside connected with a central duct and the liquid is forced therefrom by a plunger operating in a cylinder, the supply of liquid to the cylinder being controlled by a valve mechanism connected with the plunger.

In the present application as shown in the accompanying drawings a liquid supply container, here shown in the form of a cylindrical reservoir 1, is formed with a groove 2 in its underside in which is rigidly mounted a tube 3 which forms a cylinder, the ends of which project beyond the reservoir 1.

Holes 4 and 5 are bored through the adjoining walls of the reservoir 1 and cylinder 3, preferably in transverse alignment, the hole 5 having a tube 6 inserted therein and extending upwardly to a position adjacent the screw cap 7 at the top of the reservoir. The hole 3 directs the flow of the root-killing liquid into the cylinder and the tube 6 which extends from the hole 5 in the cylinder well above the top of the liquid in the reservoir allows the escape of air from the cylinder as the liquid flows into same.

A handle tube 8 is secured in one end of the cylinder 3 and a bushing 9 is secured in the inner end thereof.

A rod 10 is slidably mounted in the bushing 9 and has mounted on its inner end within the cylinder, a plunger 11, preferably in the form of a sleeve of wood or other suitable material which is a sliding fit in the cylinder. A cupped washer 12 is mounted on the rod 10 abutting the inner end of the plunger and it is held in place by a washer 13 secured by a lug 14 formed by notching or deforming the rod.

The opposite end of the plunger is formed with an extension 15 of reduced diameter and a cupped washer 16 abuts the end of the extension with its flange extending over the same. This washer is held in place by a washer 17 secured by a lug 18 formed by notching or deforming the rod.

The rod 10 is reduced in diameter immediately beyond the washers 12 and 13 and the extremity of the reduced portion 19 is formed with a knob or ball end 20 which extends into a socket 21 of a valve member 22. The valve 22 is preferably formed with a rounded enlarged perimeter 23 which is adapted to engage the inner edge of the central orifice of a ferrule 24 which is secured or forms part of the end of the cylinder 3.

The valve 22 is provided on its outward side with a recessed lug projection 25 in which is secured a looped wire 26.

It will be noted that when the valve member 22 is in closing engagement with the ferrule 24 the washer 12 is spaced immediately adjacent to the holes 4 and 5 in the cylinder leading to the reservoir 1. Consequently liquid from the reservoir may flow freely into the chamber formed in the end of the cylinder between the valve and the plunger.

The plunger is of such a length that when the rod is pushed inwardly until the plunger reaches the ferrule 24 the holes 4 and 5 are closed by the plunger and the liquid is retained from leaking past the plunger by the cupped washer 16 at its outer end.

The space between the inward end of the plunger and the valve 22 when seated, being in communication with the liquid supply through the medium of the opened port or hole 4, fills with the liquid as described and the amount of liquid contained in this space is sufficient for the proper application to a single weed.

Attached to the end of the cylinder 3 closed by the ferrule 24 and the valve 22 is a tubular member 27 which is flared outwardly to form a broad flat instrument at the extremity of which is arranged a cutter blade 28 which is preferably cast or moulded into the member 27.

The inner cavity 29 of the tubular member 27 converges to a narrow passage 30 which is broadened out at a point adjacent to the blade 28 and is formed with an opening 31 which opens to the underside so that the liquid contained in the hollow blade holder will flow outwardly and downwardly over the weed root following the cutting of same by the cutter.

The looped wire member 26 secured in the valve 22 extends into the narrow passage 30 within the hollow blade holder and as the plunger moves forwardly in the operation of the device in cutting a weed the ends of the wire, which are preferably formed with short curved extremities 26', will dislodge any dirt which may have become lodged therein in a previous operation and a free flow of the liquid is assured. It will be noted that the converging of the interior of the member 27 to a narrow passage causes an increase in the velocity of flow of the liquid so that it is projected from the opening in the bottom with considerable force and thus penetrates around the weed root.

The handle tube 8 which encircles the rod 10 is slidably mounted in a handle 32 and the threaded reduced end 33 of the rod 10 is rigidly secured in the handle by a nut 34 and washer 35. A coiled compression spring 35' is enclosed in the handle abutting the end of the tube 8 and offers a spring resistance to the tool but after a limited movement the spring becomes completely collapsed and the end thrust is against a solid tool.

The tube 8 is formed with slots 36 which are engaged by a pin 37 secured in the rod 10 which prevents the reservoir from turning in relation to the handle.

In the form of structure shown in Figures 7, 8 and 9 the cylinder 3' is formed of a single structure, preferably moulded from a thermo-setting material, such as "Bakelite," which has a shoulder 24' forming a valve seat at one end and a broad platen or cradle 38 on the top side to hold the cylindrical container 1, which is secured by a nut 39 threaded on a ferrule secured on the vent tube 6' and by a suitable ferrule secured in the adjacent hole.

A modified blade holder is illustrated in Figure 10 which is preferably moulded from a suitable thermo-setting material such as "Bakelite" and in which the blade 28' is formed with extension fingers $28^x$ bedded therein.

In the operation of the device, the liquid reservoir 1 is filled with a suitable "killing" liquid such as gasoline. The handle 32 is grasped by the operator and the blade 28 is inserted under a weed top. Endwise pressure is then applied to the handle and is transmitted through the spring 35' to the blade which cuts through the root. The resiliency of the spring 35' permits the rod 10 to move endwise and the plunger 11 moves inwardly thereby moving the valve 22 to open a passage from the cylinder 3 to the hollow blade holder and the liquid in the cylinder is forced through so that it forces liquid previously injected into the blade holder out through the holes 31 directly on to the top of the severed root which the blade has cut.

The device herein shown and described is much simpler than that described in my previous application. It may be manufactured at less cost and will be much less liable to get out of order.

What I claim as my invention is:

1. A device for cutting and killing weeds comprising a cylinder having a valve seat at one end and an opening in the wall adjacent to said valve seat, a reservoir mounted on said cylinder having an opening registering with said cylinder opening, a plunger operating in said cylinder and adapted to force liquid in the cylinder past the valve seat and to seal the cylinder opening during the discharge of the liquid from the cylinder, spring means for returning said plunger, an extension from said plunger, a valve mounted on said extension adapted to close against said valve seat on the return of the plunger, and a hollow blade holder housing said valve having a discharge opening in the underside adjacent to the cutting end of the blade holder.

2. A device for cutting and killing weeds comprising a cylinder having a valve seat at one end and an opening in the wall adjacent to said valve seat, a reservoir mounted on said cylinder having an opening registering with said cylinder opening, a plunger operating in said cylinder and adapted to force liquid in the cylinder past the valve seat and to seal the cylinder opening during the discharge of the liquid from the cylinder, spring means for returning said plunger, an extension from said plunger, a hollow blade holder secured to the discharge end of the cylinder and formed with a flat longitudinal passage terminating in lateral passages opening through the bottom, and a looped wire connected with the plunger having laterally expanding ends looped to extend into the lateral passages at the extremity of the longitudinal passage in said blade holder.

3. A device for cutting and killing weeds comprising a cylinder moulded with a saddle for supporting a reservoir, a pair of holes leading from the saddle into the cylinder, and a guide concentric to the cylinder, a reservoir mounted on said saddle having holes communicating with the cylinder holes, a hollow cutter holder socketed to fit over the end of said cylinder, a rod slidable in said guide, and a plunger mounted on said rod and operating in said cylinder.

ANDREW H. WALLACE.